United States Patent
Schimmeyer

(10) Patent No.: US 6,560,983 B1
(45) Date of Patent: May 13, 2003

(54) DRINK COOLER

(76) Inventor: Werner Schimmeyer, 8937 Acorn Pl., Santa Rosa, CA (US) 95409

(*) Notice: Subject to any disclaimer, the term of this patent is extended or adjusted under 35 U.S.C. 154(b) by 0 days.

(21) Appl. No.: 10/152,970

(22) Filed: May 21, 2002

Related U.S. Application Data

(60) Provisional application No. 60/316,118, filed on Dec. 26, 2001.

(51) Int. Cl.$^7$ ................................................ B60H 1/32
(52) U.S. Cl. ..................................... 62/244; 248/311.2
(58) Field of Search ............................ 62/244, 457.3, 62/457.4; 248/214, 215, 311.2; 224/545, 555, 560; 211/75

(56) References Cited

U.S. PATENT DOCUMENTS

| | | | |
|---|---|---|---|
| 2,289,701 A | | 7/1942 | Engel et al. |
| 2,294,151 A | | 8/1942 | Wooten, Jr. et al. |
| D226,623 S | | 4/1973 | Shuford |
| 4,478,052 A | * | 10/1984 | McDowell ............ 62/244 |
| 4,653,289 A | * | 3/1987 | Hodgetts ............. 62/239 |
| 4,852,843 A | | 8/1989 | Chandler |
| 4,892,138 A | * | 1/1990 | Bibik, Jr. ............ 165/80.1 |
| 5,012,654 A | * | 5/1991 | Gatti ................. 62/244 |
| 5,092,395 A | * | 3/1992 | Amidzich .............. 165/41 |
| 5,165,646 A | * | 11/1992 | Gewecke ............. 248/311.2 |
| D338,138 S | | 8/1993 | Miyajima |
| D342,192 S | | 12/1993 | Yu |
| D342,869 S | | 1/1994 | Fry |
| D342,871 S | | 1/1994 | Stern et al. |
| 5,697,587 A | | 12/1997 | Israel |
| 5,961,083 A | * | 10/1999 | Hartmann et al. ..... 248/222.14 |
| 6,155,063 A | | 12/2000 | Felde |

* cited by examiner

*Primary Examiner*—William E. Tapolcai
(74) *Attorney, Agent, or Firm*—Walter A. Hackler

(57) ABSTRACT

A holder for supporting a beverage container against an automobile air conditioner/heater grill includes a housing having a base for holding a beverage container bottom, and open top surrounding the beverage container sides, an open back and upstanding sidewalls inner connecting the base and the open top. Sidewalls include an open front for enabling passage of air therethrough and circulation of air around the container sides. A pair of spaced apart ribs extending vertically between the base and the top across the open back and a slidable element disposed between the ribs enable vertical positioning of the housing in front of the grill. Arms, separate from the housing, are provided for engaging the grill and including an interconnecting portion for removably engaging a slidable/deflecting element.

18 Claims, 2 Drawing Sheets

DRINK COOLER

This application claims the benefit of Provisional Application No. 60/316,118 filed Dec. 26, 2001.

The present invention generally relates to a holder for supporting a beverage container for receiving air from an automobile heating and cooling system and more particularly directed to a positionable beverage holder for enabling convenient positioning of the beverage holder with respect to and in front of an automobile dashboard vent for enabling optimal cooling and heating of a beverage container supported by the holder.

Beverage holders for mounting on the dashboard or other positions within an automobile are generally well known.

For example, U.S. Pat. No. Des. 226,623, U.S. Pat. Nos. 2,289,701, and 2,294,151 show a holder for a beverage container for use against a door panel or the like. U.S. Pat. No. Des. 338,138 discloses a container holder for securing to the dashboard vent of an automobile as do U.S. Pat. No. Des. 342,192 and U.S. Pat. No. Des. 342,869.

The various beverage holders developed have the common purpose of supporting a beverage container in a stationary position, preferably for receiving heating or cooling from the dashboard, while freeing both hands of the driver and passengers in order to not only to enable safe operation of the automobile, but minimizing the possibility of spillage during vehicle maneuvers.

While these designs are useful for providing beverage container support, they do not optimize or facilitate positioning of the beverage holder in front of the dashboard air conditioning/heating vents in order to provide optimum heating and/or cooling of the beverage container supported by the holder.

Heretofore, designed holders required reattachment of the holder to the vent in order to reposition the holder in front of the vent. In this regard, optimum positioning may not be attainable because of discrete positioning of vent ribs that is necessary for coupling the beverage holder to the grill.

Other devices provide for permanently attaching supporting arms to the vent and means for adjusting the position of the beverage holder in front of the vent. However, each of these devices require positioning and coupling of the holder with attached arms in order to effect a proper position. Further, most of these devices enable only discrete positions against the grill, or vent, and this does not optimize the positioning of the holder in front of the dashboard vent.

The present invention provides for a holder for supporting a beverage container that includes separate arms for engaging the vent and an adjustable positioning and deflecting device for supporting the holder in front of the dashboard vent in an optimal position for heat transfer. Once adjusted, the holder can be removed and replaced in front of the dashboard without separate adjustment as is necessary with prior art devices. The holder can remain in position while the holder can be easily removed and replaced.

SUMMARY OF THE INVENTION

A holder in accordance with the present invention for supporting a beverage container against a automobile air conditioner/heater grill generally includes a housing having a base for holding a beverage container bottom, an open top for surrounding a beverage container sides and an open back and upstanding sidewalls connected to the base and the open top. The sidewalls include an open front for enabling passage air therethrough and circulation of air around the container sides.

A pair of spaced apart ribs extending vertically between the base and the top across the back are provided and a slidable air deflecting element, disposed between the ribs, enables vertical positioning of the housing in front of the grill. Various shapes of grills requires the support height to be adjustable so the holder is flat against the vent for greatest efficiency.

Arms, which are separate from the housing, provide for engagement with the grill and include an interconnecting portion for removably engaging the slidable element. See new concept that is length adjustable for various depths of vents.

Means are provided for releasably fixing the slidable element at selected position between the ribs in order to maximize air flow around the beverage container. Thus, after initial placement and optimization of the housing position in front of the air conditioner/heater grill, the housing may be removed leaving only the arms attached to the grill.

Upon replacement, the adjusted slidable element enables replacement of the housing at exactly the same position for optimal cooling or heating of a beverage container supported thereby. This arrangement facilitates cleaning of the holder at any time without having to directly engage and disengage the air conditioner/heater grill. Most prior art devices are often difficult to install and remove because supporting hooks are not directly visible by the user.

To facilitate the releasable mounting of the slidable element between the ribs, the ribs preferably include slots and the means for releasably fixing the slidable element includes a threaded member disposed in the sidewalls proximate the slidable member.

Preferably, the threaded member extends through the ribs and over the slidable member in order to effect direct pressure against the slidable air deflecting member by the ribs as will be hereafter described in greater detail.

The slidable member preferably includes a depending portion for engagement with the arms and shoulder portions for engagement with the ribs. In that regard, the depending portion is preferably narrower than a width measured across the shoulder portion.

The arms, which are separate from the housing as hereinabove noted, include an interconnecting portion and this portion is sized for partially encircling the depending portion of the slidable element and for bearing against the shoulder portions for providing vertical support of the holder.

An embossed rib is provided on the interconnecting portion for providing rigidity to prevent bowing of the interconnecting portion upon bending of the arms in order to provide positive with engagement with the slidable element. The slightest tightening of the top long screw brings the top of the ribs together preventing the support bar from moving.

BRIEF DESCRIPTION OF THE DRAWINGS

The advantages and features of the present invention will be better understood by the following description when considered in conjunction with the accompanying drawings in which:

FIG. 3 is a rear view of the holder shown in FIGS. 1–3 more clearly illustrating a pair of spaced apart ribs extending vertically between the top and across and open back of the housing along with a slidable deflecting element disposed within the ribs for enabling vertical positioning of the housing in front of the grill.

DETAILED DESCRIPTION

Figure 1:
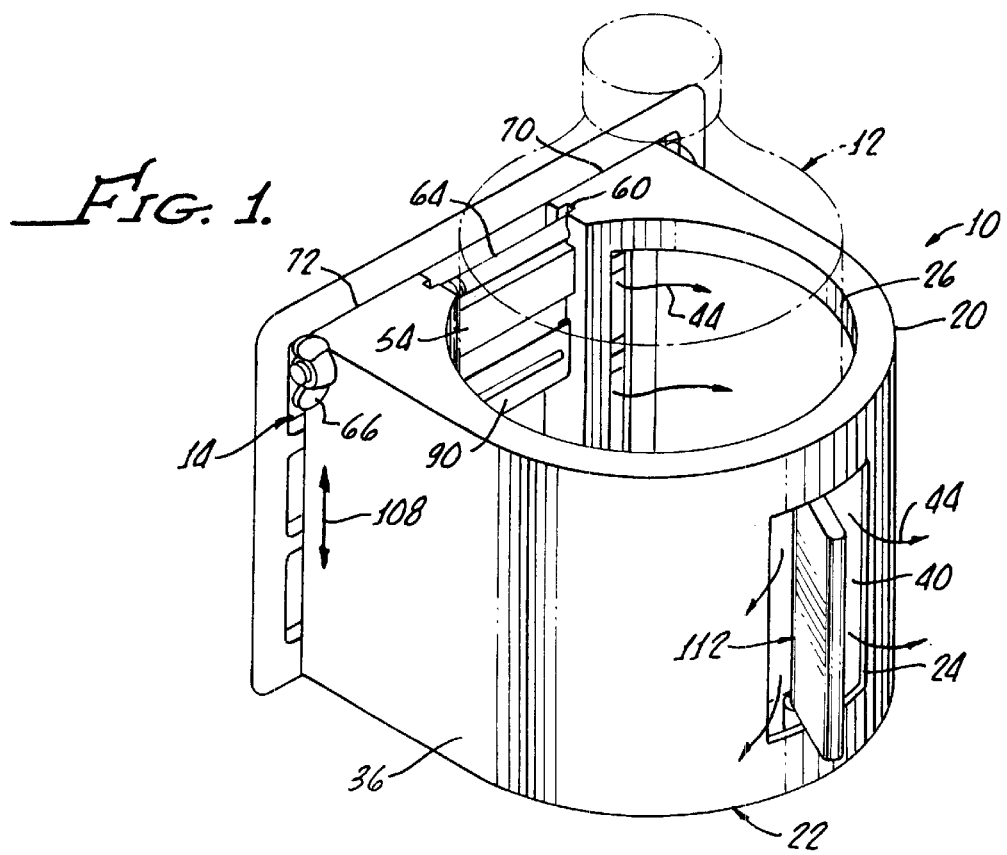
FIG. 1 is a perspective view of a holder in accordance with the present invention as it may be positioned and mounted in the front of an air conditioner/heater grill and generally showing housing including a base for supporting a beverage container, an open top for surrounding a beverage container, upstanding sidewalls for connecting the base and the open top with sidewalls having an open front for enabling passage of air therethrough and circulation around the beverage container sides.

With reference to FIGS. 1–4, there is shown a holder 10 in accordance with the present invention for supporting a beverage container 12, shown in—FIG. 1 against an automobile air conditioner/heater grill 14.

The holder generally includes a housing 20, which may be formed from any suitable material, such as plastic or the like, having a base 22 for holding a bottom 24 of the beverage container 12 and an open top 26 for surrounding beverage container sides 28.

Figure 3:
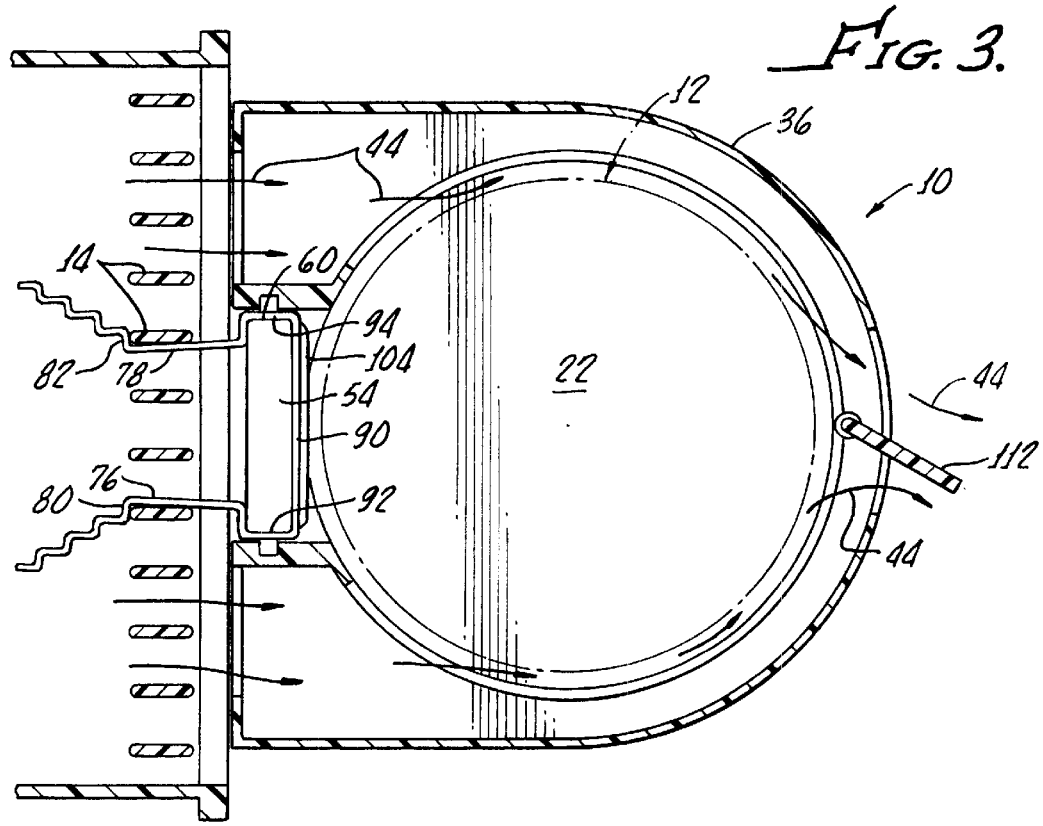
FIG. 3 is a top view of the holder shown in FIGS. 1 and 2.
Figure 4:
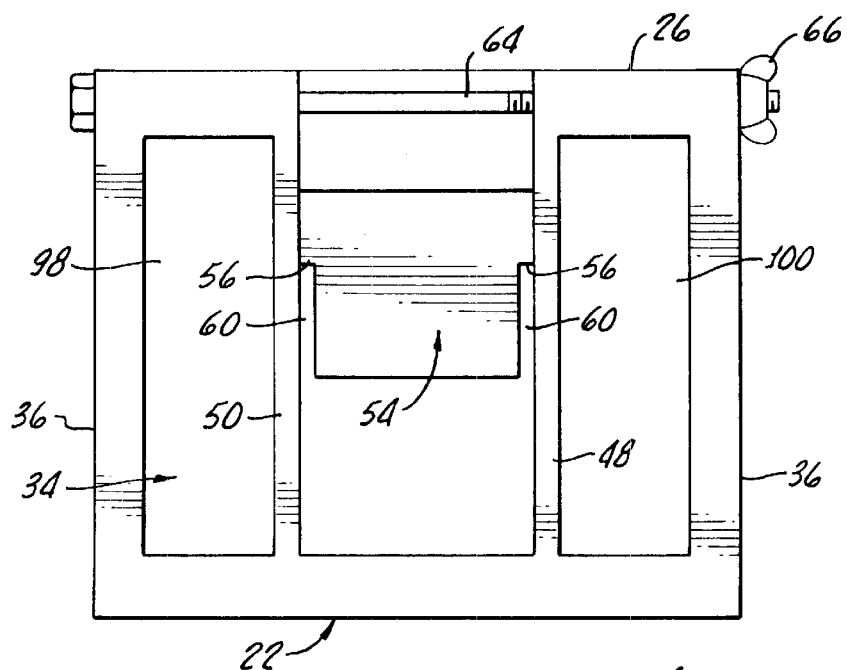

An open back 34 was clearly appreciated in FIG. 4 an upstanding sidewalls 36 connecting the base 22 and top 26 having an open front enable the passage of air through the housing 20 and circulation of air around the container sides 28 as shown by the arrows 44 in FIGS. 1, 3.

A diaphragm, not shown, may be utilized across the open top 26 for both stabilizing the beverage container 12 within the housing 20 and for further providing a closed conduit for passage of air as indicated by the arrows 44 pass the container sides 28.

As is most clearly shown in FIG. 4, a pair of spaced apart ribs 48, 50 extend between the base 22 and the top 26 across the open back 34 of the housing 20. A slidable element 54 is disposed between the ribs 48, 50 for enabling vertical positioning of the housing 20 in front of the grill 14 an optimization of airflow around the beverage container 12.

Figure 2:
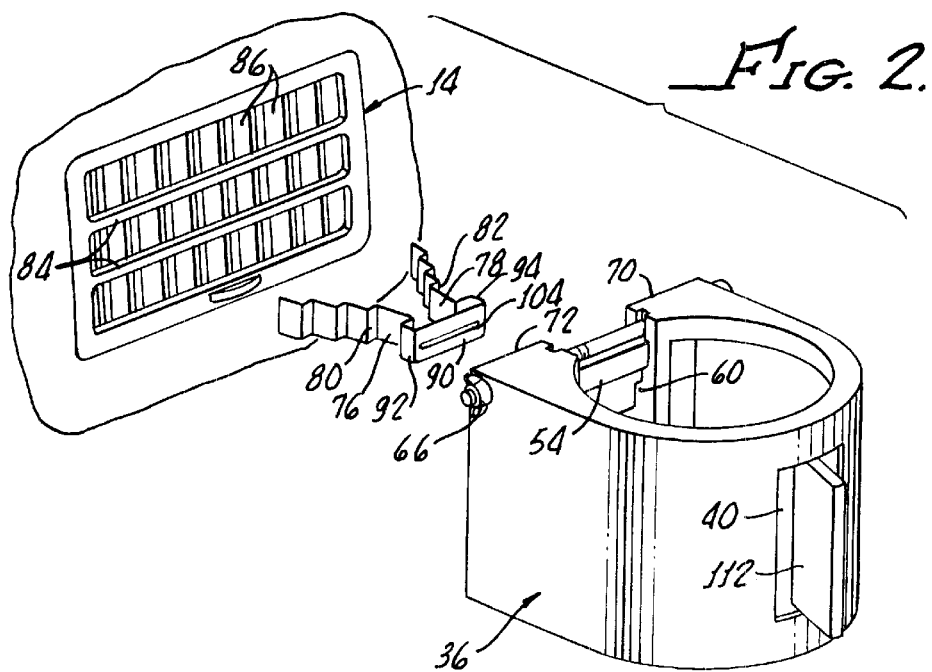
FIG. 2 is a perspective exploded view of the holder in accordance with the present invention more particularly illustrating arms which are separate from a housing for engaging a grill and including an interconnecting portion for removably engaging a slidable deflecting element between ribs of the housing.

This vertical positioning is enabled by shoulders 56 for engaging slots 60 in the ribs 48, 50 as thus seen in FIG. 2. A threaded member 64 provides a means for releasably fixing a slidable element 54 between the ribs 48, 50 at a selected position between the ribs 48, 50.

Because of the resilient nature of the housing 20 a wing nut 66 may be utilized to urge ends 70, 72 toward one another thus causing a deflection of the ribs 48, 50 toward one another and binding of the slidable element 54 at any selected position. It should be appreciated other clamps, or compressing devices, may be utilized to effect the compression of the ribs 48, 50 toward one another in order to bind, or removably fix, the slidable element 54 therebetween and such variations are to be considered within the scope of the present invention.

In order to attach the holder to the grill 14, arms 76, 78 include hooks 80, 82 for engaging grill portions 84, 86. The arms 76, 78 include an interconnecting portion 90 which is sized and shaped with side members at 92, 94 for partially encircling the slidable element 54 as best shown in FIG. 3. The housing 20 is thus supported by the side portions 92, 94 bearing against the shoulders 56 of the slidable element 54.

The slidable element 54 further functions to direct air around the sides 28 of the beverage container through the open back 34 by a channels 98, 100 established between the ribs 54, 50 and sides 36 of the housing 20.

In order to insure a proper nesting between the interconnecting portion 90 and the slidable element 54 an embossed rib 104 provides rigidity to the interconnecting portion 90 to prevent bowing thereof upon bending of the arms 76, 78 during and after engagement of the hooks 80, 82 with the grill portions 84, 86.

To install the holder 10, the arms 76, 78, are compressed toward one another and inserted into the grill 14 in order engage grill portions 84, 86. This operation is conveniently done without the housing 20 thereto, thus, enabling visual alignment and correct placement of the arms 76, 78. Prior art devices which have arms permanently attached thereto do not provide this convenience and accordingly do not facilitate the attachment of any such holder (not shown) to the grill 14.

After attachment of the arms 76, 78 with inner connecting portion 90 to the grill 14 the housing 20 is removably attached thereto by slipping the element 54 between the sides 92, 94. Thereafter, the housing can be adjusted in a vertical position as illustrated by the arrow 108 in FIG. 1 by sliding the element 54 within the slot 60. When an optimum position is reached for directing air from the grill 14 through the housing 20 the wing nut 66 may be rotated in order to bind, or temporarily attach the element 54 to the housing between the ribs 56 and in the slots 60. At this position, the element also functions to optimally direct air around the beverage container 12.

After this adjustment is made, the housing may be removed at any time for cleaning of housing or the dashboard and replaced without further consideration as to placement. Accordingly, the element 54 provides for a memory of housing placement in front of the grill 14. This is a significant improvement over prior art devices in which attention must be paid when a holder is reattached to a grill 14.

In order to restore the directional airflow capability typically provided by the grill 14, a vane 112 disposed in the open front 40 between the base 22 and the top 26 may be provided. This enables air exiting the open front 40 to be selectively directed in a right ward or left ward direction outbound from the open front 40. While illustrated as a vertical vane 112, horizontal vanes, (not shown), used separately or in combination with the vertical vane 112 may be employed in order to preferentially direct air exiting from the open front 40.

Although there has been hereinabove described a holder for supporting a beverage container against an automobile air conditioner/heater grill in accordance with the present invention for the purpose of illustrating a manner in which the invention may be used to advantage, it will be appreciated that the invention is not limited thereto. Accordingly, any and all modifications, variations or equivalent arrangements which may occur to those skilled in the art, should be considered to be within the scope of the invention as defined in the appended claims.

What is claimed is:

1. A holder for supporting a beverage container against an automobile air conditioner/heater grill, said holder comprising:

a housing having a base for holding a beverage container bottom, an open top for surrounding beverage container sides, an opening back and upstanding sidewalls connecting said base and open top, the sidewalls having an open front for enabling passage of air therethrough and circulation of air around the container sides;

a pair of spaced apart ribs extending vertically between said base and top across said open back;

a slidable element disposed between the ribs for enabling vertical positioning of said housing in front of the grill;

arms, separate from said housing for engaging the grill and including an interconnecting portion for removably engaging said slidable element; and means for releasably fixing said slidable element at a selected position between said ribs.

2. The holder according to claim 1 wherein the ribs include slots for engaging said slidable element.

3. The holder according to claim 2 wherein the means for releasably fixing said slidable element includes a threaded member disposed in the sidewalls proximate said slidable element.

4. The holder according to claim 3 wherein said threaded member extends through the ribs and over said slidable member.

5. The holder according to claim 4 wherein said slidable element includes a depending portion for engagement with the arms and shoulder portions for engagement with the ribs.

6. The holder according to claim 5 wherein said depending parts is narrower than a width measured across the shoulder portion.

7. The holder according to claim 6 wherein said interconnecting portion is sized for partially enclosing said depending portion and for bearing against the shoulder portions.

8. The holder according to claim 7 wherein said interconnecting portion includes an embossed rib for providing rigidity to prevent bowing of said interconnecting portion upon bending of the arms in to order to provide positive engagement with said slidable element.

9. The holder according to claim 8 further includes a vane disposed in said open front of the housing for enabling air, exiting front said open front to be preferentially directed.

10. A holder for supporting a beverage container against an automobile air conditioner/heater grill, said holder comprising:

a housing having a base for holding a beverage container bottom, an open top for surrounding beverage container sides, an opening back and upstanding sidewalls connecting said base and open top, the sidewalls having an open front for enabling passage of air therethrough and circulation of air around the container sides;

a pair of spaced apart ribs extending vertically between said base and top across said open back;

a deflecting element disposed between the ribs for causing directed air flow through said housing and around said beverage container;

arms, separate from said housing for engaging the grill; and an interconnecting portion engaging disposed between said arms for releasably fixing said deflecting element at a selected position between said ribs.

11. The holder according to claim 10 wherein the ribs include slots for engaging said deflecting element.

12. The holder according to claim 11 further comprising a threaded member disposed in the sidewalls proximate said deflecting element for compressing said ribs toward one another.

13. The holder according to claim 12 wherein said threaded member elements through the ribs and over said deflecting member.

14. The holder according to claim 13 wherein said deflecting element includes a depending portion for engagement with the arms and shoulder portions for engagement with the ribs.

15. The holder according to claim 14 wherein said depending portion is narrower than a width measured across the shoulder portion.

16. The holder according to claim 15 wherein said interconnecting portion is sized for partially enclosing said depending portion and for bearing against the shoulder portions.

17. The holder according to claim 16 wherein said interconnecting portion includes an embossed rib for providing rigidity to prevent bowing of said interconnecting portion upon bending of the arms in to order to provide positive engagement with said slidable element.

18. The holder according to claim 17 further includes a vane disposed in said open front of the housing for enabling air, exiting front said open front to be preferentially directed.

* * * * *